(No Model.)

J. FERREL.
VEHICLE BRAKE.

No. 588,968. Patented Aug. 31, 1897.

Witnesses
George H. Bliss, Jr.
D. H. Naylor

Inventor
John Ferrel.
By Attorney
Herbert W. T. Jenner.

UNITED STATES PATENT OFFICE.

JOHN FERREL, OF ZANESVILLE, OHIO.

VEHICLE-BRAKE.

SPECIFICATION forming part of Letters Patent No. 588,968, dated August 31, 1897.

Application filed October 15, 1896. Serial No. 608,955. (No model.)

*To all whom it may concern:*

Be it known that I, JOHN FERREL, a citizen of the United States, residing at Zanesville, in the county of Muskingum and State of Ohio, have invented certain new and useful Improvements in Vehicle-Brakes; and I do hereby declare the following to be a full, clear, and exact description of the invention, such as will enable others skilled in the art to which it appertains to make and use the same.

This invention relates to vehicle-brakes; and it consists in the novel construction and combination of the parts hereinafter fully described and claimed.

Figure 1:
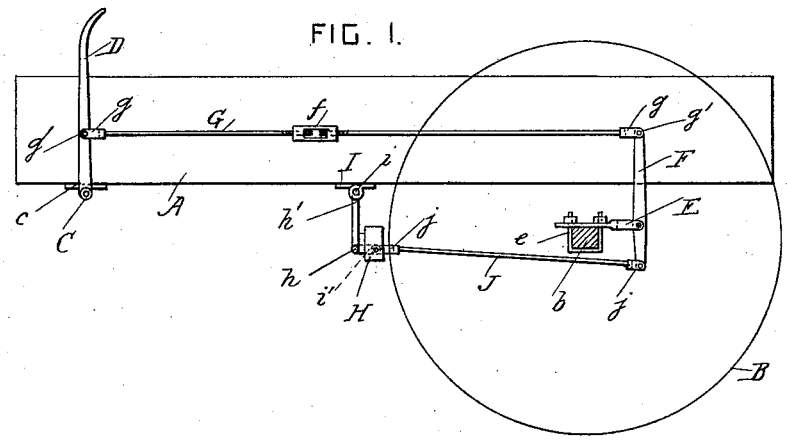
Figure 2:
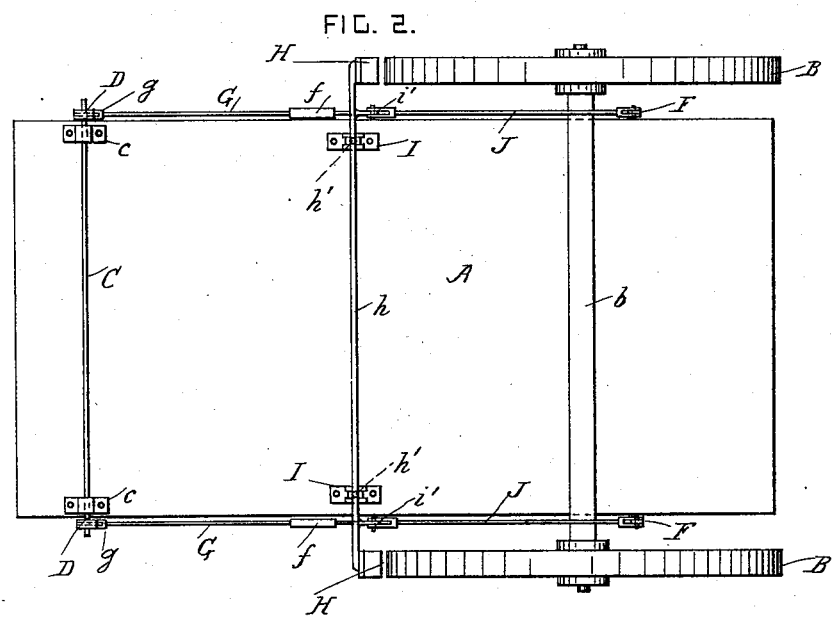
Figure 3:
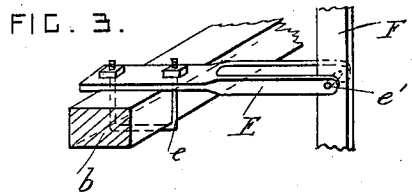

In the drawings, Figure 1 is a side view of the brake mechanism. Fig. 2 is a plan view of the same from below. Fig. 3 is a detail perspective view of one of the brackets attached to the axle.

A is a portion of the body of a vehicle. B are the wheels to which the brakes are applied, and $b$ is the axle on which the wheels B are mounted. These parts are of any approved construction, and the body may be supported on the axle either with or without springs.

C is a shaft journaled in bearings $c$, which are secured to the front part of the body A. The shaft C extends crosswise under the body, and D are brake-levers, which are secured one on each end of the shaft C and project upwardly, so as to be conveniently within the reach of persons riding in the vehicle.

E are forked brackets, and $e$ are clamps securing the said brackets to the axle $b$. The forked portions of the brackets project longitudinally of the vehicle from the axle, and they may project either rearwardly or forwardly at any angle, as may be found most convenient.

F are levers pivoted in the forked ends of the brackets E on the pins $e'$.

G are rods provided with double eyes $g$ at each end and pins $g'$, which connect them, respectively, with the brake-levers D and with the upper ends of the levers F. Turnbuckles $f$ are provided in the rods G and engage with right and left hand screw-threads on the separate parts of the rods, so that their lengths can be adjusted.

H are the two brake-blocks which bear against the wheels, and $h$ is a coupling-bar which is secured to the said brake-blocks and extends crosswise under the body A. The bar $h$ is provided with arms $h'$, the upper ends of which are pivoted to the brackets I by the pins $i$. The brackets I are secured to the body A.

J are rods provided with double eyes $j$ at each end which are pivoted, respectively, to the lower ends of the levers F and to lugs $i'$ on the bar $h$. The lower ends of the levers F are shorter than their upper ends, so that the brake-blocks are pressed against the wheels with considerable force when the brake-levers are operated. The brake-blocks hang clear of the wheels when the brake-levers are not operated.

What I claim is—

The combination, with a vehicle-body; of a coupling-bar provided with lugs $i'$, arms $h'$ pivoted to the body, and brake-blocks; pivoted levers supported from the axle in substantially vertical planes one at each side of the body, bearings secured to the body, a shaft journaled in the said bearings and extending transversely under the body, brake-levers secured to the respective ends of the said shaft and enabling the brakes to be applied from each side of the body, rods pivotally connecting the lower parts of the lugs $i'$ on the said levers with the said coupling-bar, and rods arranged one at each side of the body and pivotally connecting the upper parts of the said levers with the said brake-levers, substantially as set forth.

In testimony whereof I affix my signature in presence of two witnesses.

JOHN FERREL.

Witnesses:
H. P. WILLEY,
L. E. DODD.